Nov. 8, 1938.　　　A. H. BROMANN, JR　　　2,136,232
REFRIGERATING METHOD AND APPARATUS
Filed Jan. 9, 1937
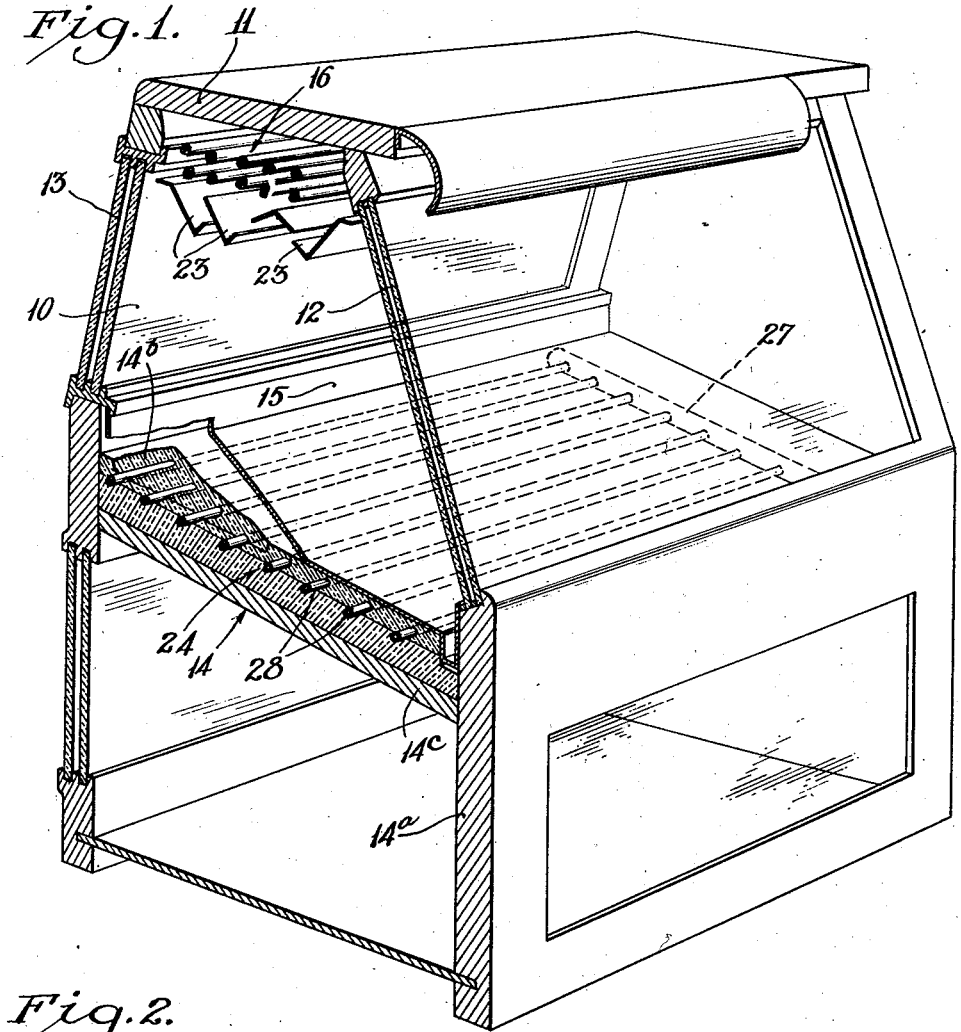
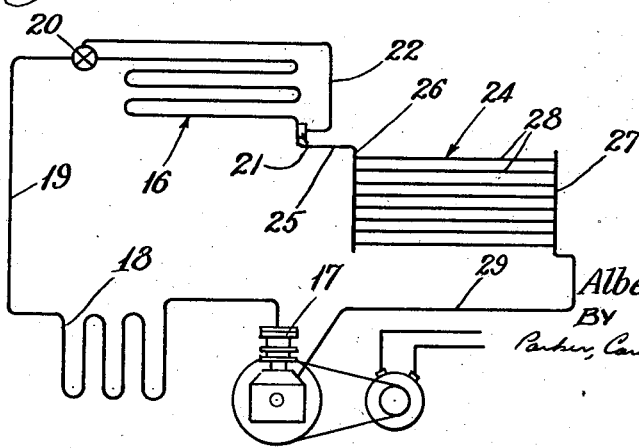
Inventor
Albert H. Bromann Jr.
BY Parker, Carlson, Pitzner & Hubbard
Attorneys.

Patented Nov. 8, 1938

2,136,232

UNITED STATES PATENT OFFICE 2,136,232

REFRIGERATING METHOD AND APPARATUS

Albert H. Bromann, Jr., River Forest, Ill., assignor to Bromann Bros., Chicago, Ill., a corporation of Illinois Application January 9, 1937, Serial No. 119,726

5 Claims. (Cl. 62—89.5)

The invention relates to novel methods of refrigeration and food preservation as well as to an improved form of refrigerating apparatus which may be utilized to carry out such methods.

The present invention has particular utility as applied to display cases for preserving meat and other perishable foodstuffs although it is susceptible of a wide variety of other uses. Such display cases are ordinarily provided with a refrigerating apparatus for maintaining the air therein at a temperature of approximately 40° F., which has been found to be suitable for preserving meat in a fresh, salable condition for comparatively long periods of time. The proper cooling of the bottom wall on which the meat or the like is supported has, however, been the source of great difficulty. If this supporting surface is not specially cooled, the heat leaking in from the exterior causes the lower side of the meat to become slimy and discolored. On the other hand, if a portion of the ordinary cooling coil is arranged in heat exchange relation with the bottom wall, moisture is frozen thereon and any meat which comes in contact with the bottom wall is also frozen. As a result, difficulty is had in cleaning this supporting surface and the material supported thereon is often injured.

One object of the present invention is to provide a novel method of preserving meat or other foodstuffs by refrigeration by means of which the meat is maintained in a sanitary and salable condition by a minimum amount of artificial cooling.

Another object of the invention is to provide an improved refrigerated display case suitable for carrying out the method herein contemplated and in which a refrigerating machine of low capacity may be utilized to effect the necessary cooling.

Stated more specifically, another object of the invention is to provide an improved refrigerated display case in which a primary refrigerant evaporator is arranged to cool the air within the case and a secondary refrigerant evaporator connected in series relation with the first evaporator utilizes the heat absorbing capacity of the refrigerant discharged from the first evaporator to cool the bottom wall of the display case to approximately the temperature of the air therein.

Still another object of the invention is to provide a plural evaporator refrigerating system which may be operated in accordance with a novel method of refrigeration herein contemplated to provide a sharp freezing evaporator and a higher temperature evaporator all with a high degree of over-all efficiency.

A further object of the invention is to provide a novel method of operating a plural evaporator refrigerating system in such manner that one evaporator may be maintained at a predetermined low temperature while at the same time a maximum amount of the heat absorbing capacity of the refrigerant in the system is utilized for useful work.

Further objects and advantages of the invention will become apparent as the following description proceeds and the features of novelty which characterize the invention are pointed out with particularity in the claims annexed to and forming a part of this specification.

For a better understanding of the invention reference may be had to the accompanying drawing, in which:

Figure 1 is a perspective view of a refrigerated display case in transverse section, adapted to carry out the present invention.

Fig. 2 is a diagrammatic illustration of the refrigerating apparatus included in the display case shown in Fig. 1.

For purposes of practical illustration of its various aspects, the invention has been described herein as applied to a refrigerated display case of the general type ordinarily used in meat markets and like establishments. The novel method herein disclosed of preserving perishable foodstuffs, such as meat, by refrigeration includes in general the steps of supporting the meat on a cooled surface maintained at a temperature between 32° F. and 45° F. and circulating air over the meat which has been artificially cooled to a temperature approximately equal to that of the surface on which the meat is supported. All of the exposed area of the meat or other foodstuff is thus maintained at a substantially uniform temperature suitable for its preservation in a sanitary and salable condition. The novel method of refrigeration and improved apparatus for carrying out the same herein disclosed are particularly suited for practicing this method of food preservation. In general, this novel method of refrigeration contemplates the use of a primary evaporator in which a liquid refrigerant is permitted to expand in order to maintain the evaporator at a temperature below 32° F. to form a sharp freezing zone and the remaining heat absorbing capacity of the refrigerant discharged from the primary evaporator is used to cool a second evaporator having a relatively large heat exchange surface. In the event that this method is to be applied to a display case, the primary evaporator may be utilized to cool the air circulated within the case and the secondary evaporator utilized to cool the supporting surface on which the perishable foodstuffs are arranged.

Referring more particularly to Fig. 1, a display case has been shown therein having a heat insulated storage compartment 10 defined by a top wall 11, double thickness transparent front and rear walls 12 and 13, made of suitable glass panels arranged in spaced relation, and a bottom wall designated generally by the numeral 14. This structure is carried by a suitable rectangular base 14a. The general outer construction of the display case or cabinet is conventional in form and it is not believed to be necessary to describe it in further detail.

The upper surface of the lower wall 14 of the storage compartment 10 is formed by a sheet metal plate or sheath 15 which provides a smooth, easily cleaned surface upon which meat or other perishable foodstuffs may be supported in a position to be readily viewed through the transparent front wall 12. Provision has been made for maintaining the plate 15 of the storage compartment at substantially the same temperature as the cooling air circulated within the compartment. As a result, the foodstuffs supported on the plate or slab 15 are kept at a uniform temperature suitable for their preservation. The air within the compartment 10 may be cooled by circulating the same either by forced draft or convection over the surfaces of a cooling unit.

In the preferred construction illustrated, the air within the compartment 10 is cooled by a primary evaporator unit designated generally by the numeral 16. This unit includes a plurality of elongated refrigerant circulation conduits and is of the dry type. A suitable liquefiable volatile refrigerant such as sulphur dioxide is compressed by an electric motor driven compressor 17 (Fig. 2), liquefied in an air cooled condenser 18, and supplied to the primary evaporator 16 through a conduit 19. The flow of liquid refrigerant to the evaporator 16 is controlled by a thermostatic expansion valve 20 arranged at the inlet of the evaporator and having a controlling thermostatic bulb 21 clamped in heat exchange relation with the outlet of the evaporator, the bulb being connected to the valve through the usual capillary tube 22. The expansion valve 20 is set to maintain the evaporator 16 at a temperature below 32° F. substantially throughout its length, thus providing in effect a sharp freezing unit having a comparatively low temperature. Provision is also preferably made for periodically shutting off the flow of refrigerant to the evaporator 16 in order to permit its temperature to rise to some value above 32° F., such as 38° F., in order to defrost the same. Any moisture which has previously condensed on the surface of the evaporator is thus returned to the air within the storage compartment 10 and its humidity raised. Thermostatic valves of this type are rather inaccurate and consequently, it is preferable in the system herein disclosed to set the valve to supply substantially all or slightly more refrigerant than can be evaporated in the primary evaporator, the excess then being utilized in a secondary evaporator as is hereinafter described.

The primary evaporator unit 16 is preferably arranged at the top of the compartment 10 in relatively compact form. The air surrounding the evaporator 16 is thus cooled, thereby increasing its specific gravity so that it flows toward the bottom of the compartment. The convection currents thus set up serve to circulate the cooling air over articles stored in the compartment. A series of sheet metal baffles 23 serve to direct this flow of cooling air. It will be noted that the two baffles disposed at the lateral edges of the evaporator 16 are directed downwardly and inwardly so as to prevent the cool air leaving the surfaces of the evaporator 16 from coming directly into contact with the glass walls 12 and 13 and thereby frosting the same. With such an arrangement, the air within the storage compartment may be readily maintained at a temperature between 35° F. and 45° F.

In accordance with one aspect of the present invention, an arrangement has been provided for utilizing the heat absorbing capacity of the refrigerant discharged from the primary evaporator 16 which in many instances has heretofore been wasted. This arrangement, in the present instance, serves to carry out the improved method of food preservation herein disclosed but in addition it also serves to very materially reduce the compressor capacity required for the system. In its more general aspects, this arrangement with its increased efficiency may be applied to many other types of refrigeration installations as will be apparent to those skilled in the art. In the particular construction illustrated, refrigerant discharged from the primary evaporator 16 is conveyed to a second evaporator designated generally by the numeral 24 through a conduit 25.

The secondary evaporator 24 has a relatively large surface area with which the refrigerant is circulated in heat exchange relation. It includes an inlet header 26 and an outlet header 27 communicating through a plurality of parallel connected cross circulation conduits 28. The headers 26 and 27 are substantially equal to or slightly greater in cross sectional area than the supply conduit 25 while the cross circulation conduits 28 are individually somewhat smaller in cross sectional area. The total cross sectional area of the conduits 28 is slightly greater than that of the inlet header 26. Since the primary evaporator 16 is maintained at a comparatively low temperature, the gaseous and in some instances liquid refrigerant discharged therefrom is quite cold. This refrigerant is circulated through the secondary evaporator 24 and in heat exchange relation with its large surface area, thereby absorbing heat from the compartment bottom plate 15. The gaseous refrigerant discharged from the header 27 is returned to the compressor 17 through conduit 29. The header 27 is placed slightly lower than the header 26 to facilitate gravity flow of any liquid refrigerant in the secondary evaporator. Upon reference to Fig. 1, it will be seen that the conduits 28 are disposed in close heat exchange relation with the compartment bottom plate so that it is cooled thereby but is, at the same time, maintained at a temperature above 32° F. The conduits 28 are embedded in a cementious heat conducting material 14b which is spread over the top of a heat insulated horizontal partition 14c. The extended evaporator thus provided in the bottom wall of the compartment 10 serves as a heat barrier which prevents the leakage of heat from the exterior into the cabinet through this bottom wall. The supporting plate 15 on the bottom of the display cabinet may thus be maintained at a temperature between 32° F. and 45° F.

It has been found that an apparatus such as that described above may be operated with a high degree of efficiency and the compressor capacity required is only approximately 50 per cent of that utilized in former display cases in which the cooling was had from a single evaporator unit over which the air within the storage compartment was circulated. In the improved arrangement herein disclosed, it is believed that the increased efficiency is attributable both to the greater utilization of the heat absorbing capacity of the refrigerant and also to the particular arrangement of the cooling units. In this latter respect, the extended surface of the secondary evaporator 24 makes possible an efficient absorption of heat from the air within the cabinet even though the differential in temperature is small while the disposition of the evaporator 24 over the bottom wall of the compartment also forms an effective heat insulating barrier. A marked increase in the relative humidity of the air within the cabinet is also had in the arrangement described as contrasted with one in which all of the cooling is done by low temperature or sharp freezing evaporators, this effect in the present instance being due at least in part to the fact that the air within the cabinet is partially cooled by the secondary evaporator 24 which is maintained at a temperature above 32° F. and consequently does not condense any great amount of moisture from the air in the cabinet.

Although a specific application of the invention has been shown and described in some detail for purposes of illustration, there is no intention to thereby limit the invention to this specific application but, on the other hand, the appended claims are intended to cover all modifications within the spirit and scope of the invention.

I claim as my invention:

1. A refrigerated display case comprising a heat insulated chamber having a generally horizontal wall therein adapted to support foodstuffs thereon, means including a dry-type refrigerant evaporator disposed adjacent the top of said compartment for cooling the air therein to a temperature below 45° F., means including a thermostatic expansion valve located at the inlet of said evaporator and controlled by a thermostatic bulb at the outlet thereof for controlling the flow of refrigerant to said evaporator, and means including a second refrigerant evaporator connected in series relation with said first named evaporator and extending in heat exchange relation with substantially the entire area of said wall for maintaining said wall at a temperature between 32° F. and 45° F., whereby a barrier is formed against the leakage of heat from the exterior through said wall without freezing of materials thereon, said second evaporator including an inlet header communicating with the outlet of said first-named evaporator and an outlet header communicating with said inlet header through a plurality of cross-circulation passages defined by conduits each communicating at their opposite ends with said headers.

2. A refrigerated display case comprising a heat insulated chamber having a generally horizontal wall therein adapted to support foodstuffs thereon, means including a refrigerant evaporator for cooling the air within said compartment to a temperature below 45° F., and means including a second evaporator connected in series relation with said first named evaporator and utilizing the refrigerant discharged therefrom for maintaining said wall at a temperature between 32° F. and 45° F., whereby a barrier is formed against the leakage of heat from the exterior through said wall without freezing of materials thereon.

3. A refrigerated display case comprising a heat insulated chamber having a generally horizontal wall therein adapted to support foodstuffs thereon, means including a refrigerant evaporator for cooling the air within said compartment to a temperature below 45° F., and means including a second and separate refrigerant evaporator extending in heat exchange relation with substantially the entire area of said wall for maintaining said wall at a temperature close to that of the air in the compartment but above 32° F., whereby a barrier is formed against the leakage of heat from the exterior through said wall without freezing of materials thereon.

4. A refrigerated display case comprising a heat insulated chamber having a generally horizontal wall therein adapted to support foodstuffs thereon, refrigerating means for cooling the air within said compartment to a temperature below 45° F., and a second and separate refrigerating means for maintaining said wall at a temperature between 32° F. and 45° F., whereby a barrier is formed against the leakage of heat from the exterior through said wall without freezing of materials thereon.

5. The method of operating a refrigerator in which the food storage compartment is provided with at least one generally horizontal supporting wall for foodstuffs and in which the cabinet is cooled by circulating air over a cooling element and through the cabinet, which comprises maintaining the supporting wall at a temperature between 32° F. and 45° F. and maintaining the temperature of the cooling element periodically above and below 32° F.

ALBERT H. BROMANN, Jr.